(12) United States Patent
Malpas (10) Patent No.: US 8,978,316 B2
(45) Date of Patent: *Mar. 17, 2015

(54) INSULATED STRUCTURAL METAL PANEL WITH INTEGRATED ENERGY COLLECTORS

(71) Applicant: William Malpas, Berkeley (CA)

(72) Inventor: William Malpas, Berkeley (CA)

(*) Notice: Subject to any disclaimer, the term of this patent is extended or adjusted under 35 U.S.C. 154(b) by 0 days.

This patent is subject to a terminal disclaimer.

(21) Appl. No.: 14/140,976

(22) Filed: Dec. 26, 2013

(65) Prior Publication Data

US 2014/0102556 A1    Apr. 17, 2014

Related U.S. Application Data (63) Continuation-in-part of application No. 12/928,831, filed on Dec. 20, 2010, now abandoned.

(51) Int. Cl.
| | | |
|---|---|---|
| *E04D 1/36* | (2006.01) | |
| *H01L 31/048* | (2014.01) | |
| *E04D 3/35* | (2006.01) | |
| *F24J 2/04* | (2006.01) | |
| *H01L 31/0525* | (2014.01) | |
| *E04B 2/00* | (2006.01) | |
| *E04B 7/00* | (2006.01) | |

(52) U.S. Cl.
CPC ............ *H01L 31/0482* (2013.01); *E04D 3/352* (2013.01); *F24J 2/045* (2013.01); *H01L 31/058* (2013.01); *E04B 2/00* (2013.01); *E04B 7/00* (2013.01); *Y02E 10/50* (2013.01); *Y02E 10/44* (2013.01); *Y02B 10/20* (2013.01); *Y02B 10/12* (2013.01); *Y02E 10/60* (2013.01)

USPC ............................................. 52/58; 52/220.3

(58) Field of Classification Search
USPC .............................. 52/58, 220.1, 220.3, 173.3
See application file for complete search history.

(56) References Cited

U.S. PATENT DOCUMENTS

| | | | | |
|---|---|---|---|---|
| 4,189,881 | A * | 2/1980 | Hawley ........................... | 52/91.3 |
| 4,269,172 | A * | 5/1981 | Parker et al. .................. | 126/621 |
| 4,650,554 | A * | 3/1987 | Gordon ......................... | 205/340 |
| 5,509,246 | A * | 4/1996 | Roddy ............................ | 52/533 |
| 6,079,170 | A * | 6/2000 | Slebos ......................... | 52/220.1 |
| 6,092,587 | A * | 7/2000 | Ingram ........................... | 165/56 |
| 6,926,077 | B2 * | 8/2005 | Kuga et al. .................... | 165/170 |
| 6,928,775 | B2 * | 8/2005 | Banister ....................... | 52/173.3 |
| 7,228,886 | B2 * | 6/2007 | Seki et al. ....................... | 165/56 |
| 2006/0032527 | A1 * | 2/2006 | Stevens et al. ............... | 136/251 |

* cited by examiner

*Primary Examiner* — Basil Katcheves
(74) *Attorney, Agent, or Firm* — Howard Cohen (57) ABSTRACT

Structural insulated metal panels each include exterior and interior skins and an interior core of stiff, incompressible, insulating material. Fluid conduits extend within the panels in contact with the exterior skin to circulate fluid for heat exchange. Photovoltaic cells may be secured to the exterior skin proximate to the conduits to cool the PV cells. Edge joining features enable easy assembly of the panels into an extended matrix that is airtight, weatherproof, insulated, and self-supporting due to the inherent structural strength of the laminated panel assemblies. The panels can be configured both as solar collectors (both thermal and photovoltaic) and radiant hydronic heaters. The supply manifolds of the solar thermal panels, and the connections and output wiring of the photovoltaic panels, are enclosed in a ridge cap, and the return manifolds are enclosed in a soffit cap, yet all are accessible for maintenance.

12 Claims, 8 Drawing Sheets

INSULATED STRUCTURAL METAL PANEL WITH INTEGRATED ENERGY COLLECTORS

CROSS-REFERENCE TO RELATED APPLICATIONS

This application is a continuation-in-part of U.S. application Ser. No. 12/928,831, filed Dec. 20, 2010, for which priority is claimed.

FEDERALLY SPONSORED RESEARCH

Not applicable.

SEQUENCE LISTING, ETC ON CD

Not applicable.

BACKGROUND OF THE INVENTION

Field of the Invention

Most nations are seeking to reduce their dependence on fossil fuels. The reasons include a desire to limit carbon dioxide emissions and other by-products of combustion which have been shown to contribute to global warming, reducing our dependence on foreign oil and the political limitations imposed by that dependence, and realigning the nation's economy to produce sustainable products. A significant percentage of the nation's energy is consumed in the manufacture of buildings and building components, and a much larger percentage is consumed heating and cooling buildings.

Solar radiation falls uniformly, but not equally accessibly, across most nations. Unsurprisingly, it is most accessible in regions where buildings have high cooling loads, while in regions where it is less accessible due to seasonal weather, it is more precious. Building cooling consumes a major part of the nation's energy, and is currently accomplished in several ways: building orientation, solar shading, evaporative (swamp) cooling, or in very hot climates, heat-pump units, chillers, refrigeration compressors, condensers, and fan-coil units.

The following is a list of some prior art that appears relevant to solar radiation and building cooling.

| Number | Date | Name |
| --- | --- | --- |
| 4,051,209 | 1977-09-27 | Tabler |
| 4,010,733 | 1977-03-08 | Moore |
| 4,147,582 | 1979-04-03 | Brollo |
| 4,178,912 | 1979-12-18 | Felter |
| 4,347,093 | 1982-08-31 | Mayo et al |
| 4,392,008 | 1983-07-05 | Cullis |
| 4,607,132 | 1986-08-19 | Jarnagin |
| 4,743,485 | 1988-05-10 | Ting |
| 5,542,260 | 1996-08-06 | Bourne et al |
| 5,773,117 | 1998-06-30 | Tognelli |
| 5,931,381 | 1999-08-03 | Fiedrich |
| 6,182,903 | 2001-02-06 | Fiedrich |
| 6,220,523 | 2001-04-24 | Fiedrich |
| 6,270,016 | 2001-08-07 | Fiedrich |
| 6,422,269 | 2002-07-23 | Johansson et al |
| 6,729,081 | 2004-05-04 | Nath et al |
| 6,959,736 | 2005-11-01 | Jarvenkyla |
| 7,605,328 | 2009-10-20 | Sager et al |
| 7,638,353 | 2009-12-29 | Beernink et al |
| 7,644,736 | 2010-01-12 | Bittenbender et al |
| 2005/0199234 | 2005-09-15 | Leighton |
| 2006/0070621 | 2006-04-06 | Neumann et al |
| 2009/0223511 | 2009-09-10 | Cox |

Panels

Many buildings use insulated sandwich panels that provide three functions when used as a building envelope; an exterior weather-tight surface, thermal insulation, and an interior finished surface. The panels currently used in building construction are produced in a batch process in which the skins and core are cut to size and bonded together, or the panels are produced in a continuous roll-forming process which consists of; coils of sheet metal fed through corrugating rolls to form top and bottom skins, foam injection equipment to extrude foam between the skins, and a saw at the end to cut the panels to length.

The panels currently used in building construction for floors, walls, and roofs achieve high insulation values. The panels eliminate thermal bridging through framing members typically found in conventional stick-built construction. The panels effectively seal against air infiltration. Insulated metal panels are well-developed technology, and are much less expensive than conventional construction of equivalent thermal performance. Several types of panel systems are currently available. For example the above patents to Tognelli, Tabler, and Brollo show existing, commercially available insulated panels. Ting shows panels with gas relief channels, and some commercially available panels incorporate electrical conduits, but I have found that the efficiency and advantages of such panels are limited.

Plastic Conduit

Several types of extrudable plastic conduits, such as polyethylene (PE), cross-linked polyethylene (PEX), or polypropylene (PP), are known. For example Johansson, Jarvenkyla, and Bittenbender above show plastic conduit used in hydronic radiant systems (heating or cooling systems that transfer heat by circulating a fluid through a closed system of pipes) to circulate heated or cooled fluid to conditioned spaces within buildings. In some configurations, the conduits are field-installed directly in cementitious flooring, or gypsum floor underlayment. In other configurations, conduits are field-installed into grooves machined into wood or composite subflooring. In still other configurations, conduits are field-attached to the underside of wood subflooring. In yet other configurations, conduits are used to move heated or cooled fluid to wall-mounted radiant convectors. Extrudable plastic conduit is much less expensive and quicker to install than metallic piping.

Hydronic Cooling

There exist several approaches to hydronic heating and cooling. For example, Bourne and Fiedrich's patents above show the use of circulating fluids to cool conditioned spaces.

Solar Thermal Roofing

Many existing solar thermal panels are made as discrete assemblies, designed to be attached independently to building structures. However, several types of roofing systems with integrated collectors have been proposed, for example by Moore, Feller, Mayo, and Leighton. I have found that these roofing and integrated collectors typically have at least some of the following drawbacks: they have collector manifolds which appear very complex and prone to leakage; the fluid conduits may be inaccessible for future maintenance; many parts may be precut, but must be field-assembled in a timeconsuming manner; they require complex and expensive manufacturing processes; they do not provide cooling; they are prone to damage from freezing; they do not generate photovoltaic electricity; they are un-insulated; they are unfinished on the interior; they are difficult to install; they may damage the structure to which they are attached.

Photovoltaic Cells

Several types of photovoltaic collectors are currently used in building construction by attaching them directly to metal roofing panels. These are typically flexible, low-cost, thin-film cells, as shown by Beernink and Nath above. Alternatively cells may be printed directly onto a substrate, as shown by Sager. While both approaches are very inexpensive, they produce low wattage per unit area, unlike the relatively high output of well-known flat-plate glazed crystalline photovoltaic collectors.

Photovoltaic cells generate heat as a by-product of electrical generation. Photovoltaic cell efficiency falls off somewhat as temperatures rise. In conventional installations, flat-plate crystalline photovoltaic cells are often elevated above the roof surface to provide cooling air currents, and thin-film cells attached to metal roofing panels often have an air space below the roofing panel for cooling. With both thin-film and flat-plate crystalline cells, current installations typically leave lengths of inter-connect wiring exposed. In the event of fire during sunny conditions, firefighters or emergency personnel may disconnect a building's main electrical service from the electrical grid. This does not disable the photovoltaic cells, and the exposed wiring can carry a substantial risk of shock to personnel working near the cells, particularly when cutting holes in the roof for smoke evacuation.

Combined Solar Thermal and Photovoltaic

Cullis, Jamagin, and Cox above show solar collectors that combine both solar thermal and photovoltaic collection. These all suffer from the following drawbacks: the collectors require additional mounting methods to secure them to the building structure. Mounts, conduits, conductors, drains, and other components of the collectors are exposed in an unsightly manner. The collectors appear to be manufactured of extruded aluminum and/or glass which are both high net-embodied-energy (i.e. very energy intensive to manufacture) materials. These collectors generally require complex and expensive manufacturing processes.

BRIEF SUMMARY OF THE INVENTION

I have discovered a method and apparatus that corrects and eliminates at least some of the shortcomings of the prior art. Fluid conduits and/or photovoltaic cells are incorporated into structural insulated metal panels which can be easily assembled from component parts, or panels can be produced on continuous roll-forming lines, enabling efficient material utilization and very cost-effective production. The panels can be configured both as solar collectors and radiant hydronic heaters. The panels can yield heat as well as gain heat, and can therefore also be used as components of hydronic cooling systems. The panels have edge joining features that enable the easy assembly of the panels into an extended matrix that is airtight, weatherproof, insulated, and self-supporting due to the inherent structural strength of the laminated panel assemblies. The supply and return manifolds of the solar thermal panels, and the connections and output wiring of the photovoltaic panels, are elegantly concealed yet accessible for maintenance. The panels can be rapidly erected in the field, providing an early weather-resistant building envelope, and the panels can provide the full building insulation as well as a major part of the structural strength of the building, with finished interior and exterior surfaces that do not require any further treatment, coating, or painting.

REFERENCE NUMERALS

| | |
|---|---|
| 100 Roof panel | 102 Exterior skin |
| 103 Exterior Corrugations | 103A/103B Exterior joining feature |
| 104 Interior skin | 106A/106B Interior joining feature |
| 107 Sealant bead/strip/gasket | 123 Power cable |
| 108 Insulating core | 110 Fluid conduits |
| 112 Fluid manifold | 116 Removable sheet metal ridge cap |
| 118 Removable sheet metal cave trim | 120 Thin-film photovoltaic cell |
| 122 Electrical conductors | 124 Electrical junction box |
| 200 Wall panel | 202 Exterior skin |
| 204 Interior skin | 206 Panel-to-panel joint |
| 208 Insulating core | 210 Fluid conduits |
| 214 Fluid manifold | 216 lower wall sheet metal cover |
| 217 Field-Installed Insulation | 300 Floor panel |
| 302 Exterior skin | 304 Interior skin |
| 306 Panel-to-panel joint | 308 Insulating core |
| 310 Fluid conduits | 312 Fluid manifold |
| 316 Removable sheet metal floor cover | 317 Field-installed Insulation |
| 318 Cementitious underlayment | 320 Underlayment Stop |
| 322 Accessible maintenance chase | 324 Structural Floor Members |

DETAILED DESCRIPTION OF THE INVENTION

First Embodiment Description

Figure 1:
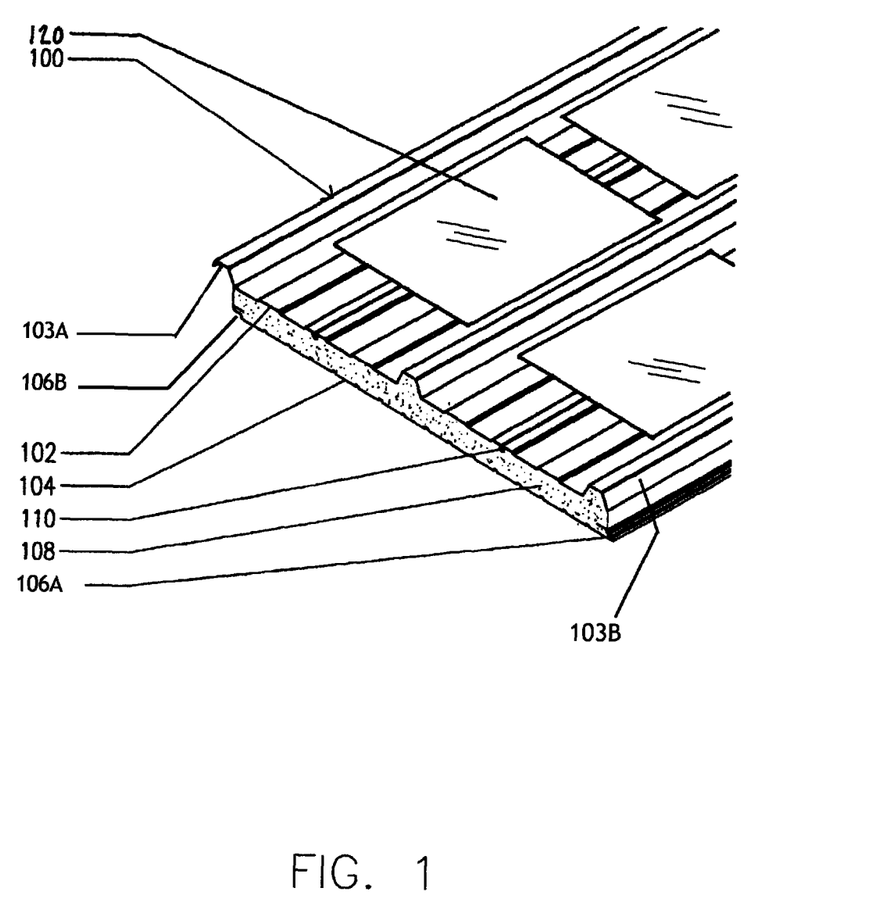
FIG. 1 is a perspective view of a roof panel with fluid conduits adjacent to the exterior surface.
Figure 1A:
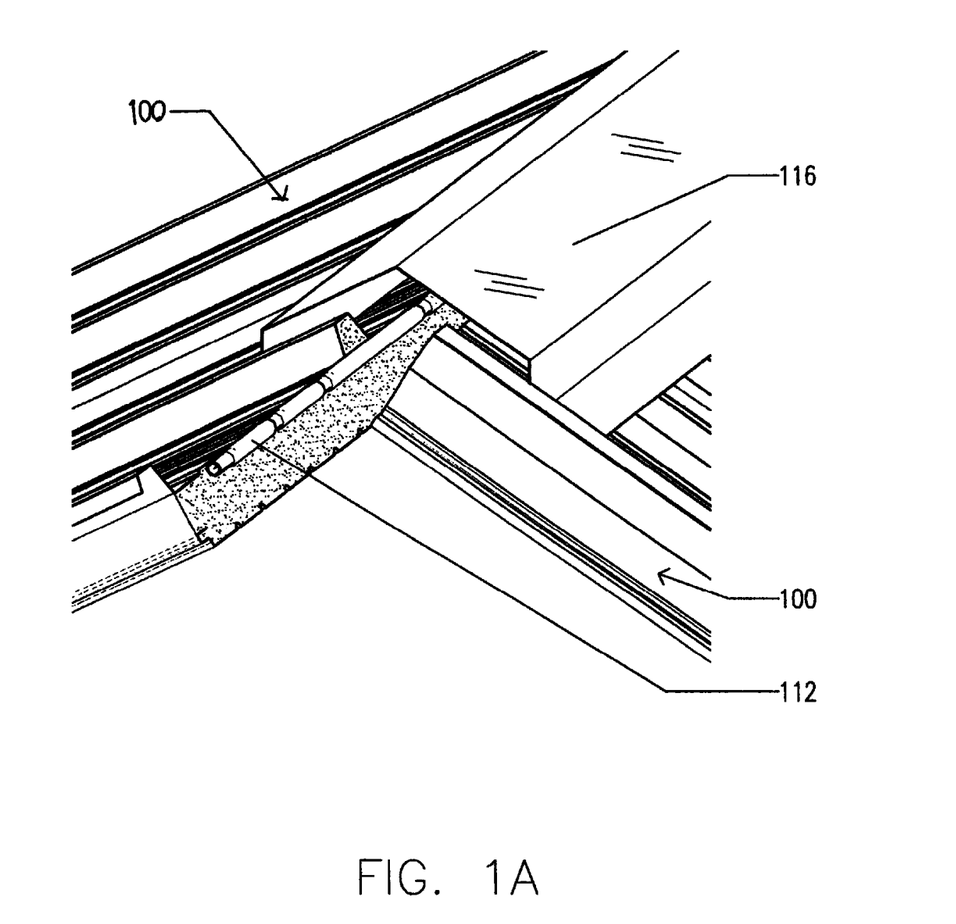
FIG. 1A is a perspective view of the roof panel ridge detail with fluid conduit manifold.
Figure 1B:
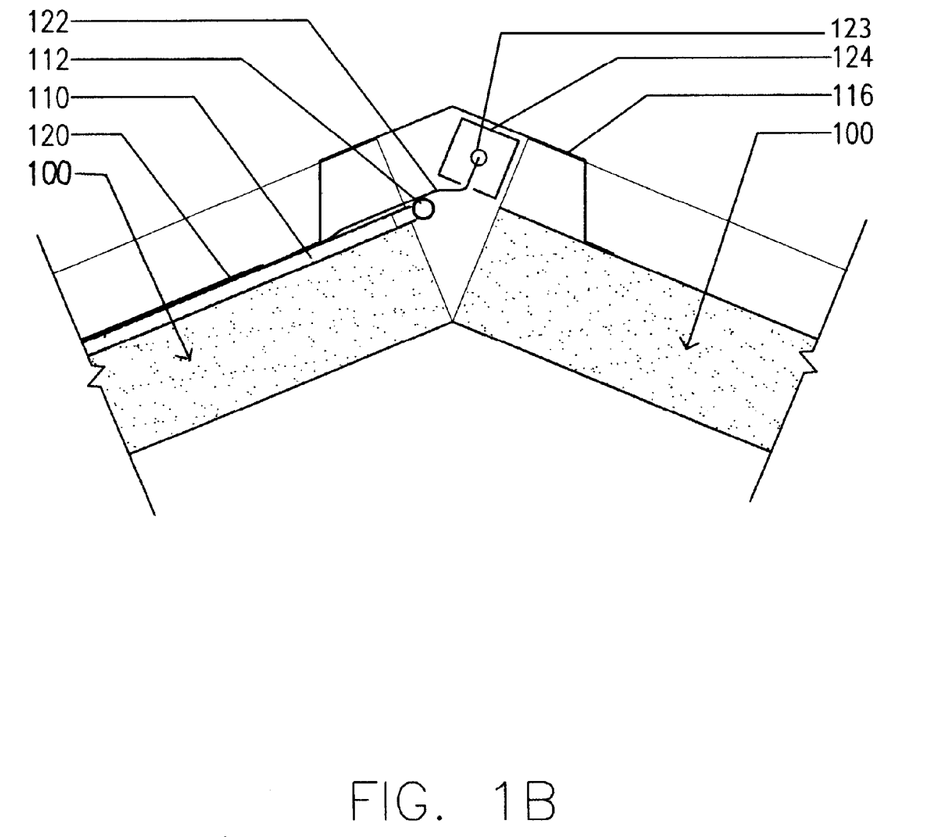
FIG. 1B is a cross-sectional elevation of the roof panel ridge detail with fluid conduit manifold and electrical junction box.
Figure 1C:
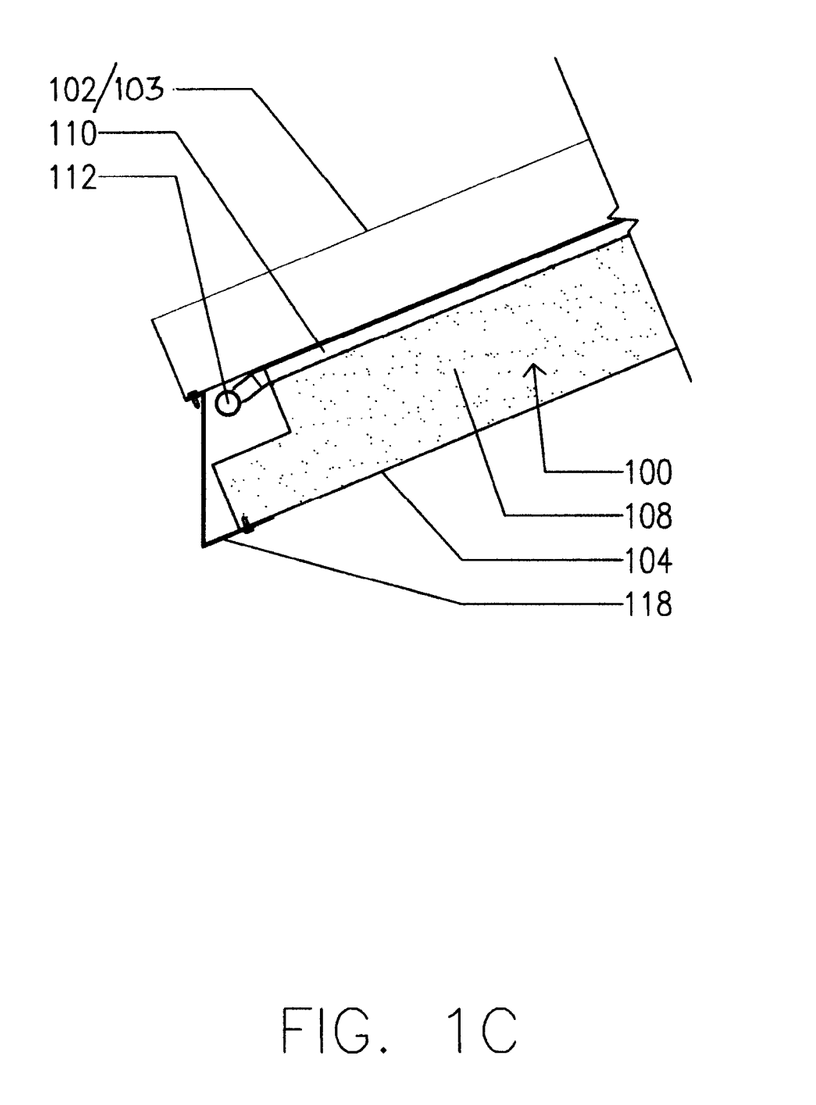
FIG. 1C is a cross-sectional elevation of the roof panel eave detail with fluid conduit manifold.

Roof Panel—FIGS. 1 Through 1C

FIG. 1 shows a perspective view of a first embodiment of an insulated metal roof panel that, as will be described, also includes solar-thermal fluid conduits and thin-film photovoltaic collectors. An insulated metal panel, shown generally at 100, comprises a thin metal exterior skin 102 with longitudinal corrugations, a thin metal interior skin 104, and an insulating core 108. Panel 100 further includes a plurality of fluid conduits 110. A plurality of photo-voltaic collectors 120 are also secured to the exterior skin 102.

As shown, the longitudinal edges at the exterior skin are shaped to facilitate joining together with adjacent panels. For example, in FIG. 1, longitudinal edge 103A comprises an open corrugation channel that projects laterally and extends longitudinally the entire length of the panel to encompass and engage the corrugation 103B adjacent to the edge of a similarly-formed panel 100 in a weatherproof manner. The exterior skin joints thus interlock or overlap to resist water penetration and air infiltration. Panels joined together provide a weather-resistant exterior roof surface, as well as the primary structural support.

Weather resistance and air infiltration resistance is achieved in three ways: 1) the longitudinally continuous points of contact between two adjacent panels are drawn together by the design of the interlock joint; 2) the longitudinally continuous points of contact between two adjacent panels are elevated above the plane of the roof that transports water run-off so that the joint is never actually wet; and, 3) the panels are installed with a continuous bead 107 of caulk or other sealant (FIG. 1D) between the mating surfaces of adjacent panels which provides a non-mechanical weather resistant seal and an air infiltration barrier.

The longitudinal edges at the interior skin are shaped to facilitate joining together with adjacent panels to provide a finished, interior surface. For example, edge connector flange 106A (see also FIG. 1D) extends the length of one edge of the panel at the interior extent thereof, and is arranged to join with a complementary opposed edge connector recess 106B to form a finished interior surface with a smooth, flush appearance.

The finished surface meets requirements selected from, but not limited to, the following list: appearance, protection, durability, safety, and cleaning. The panels may be joined with the continuous bead 107 of caulk or similar sealant between the mating surfaces of adjacent panels to provide a barrier that is void-free and weatherproof, blocking all air infiltration. The edge joining structures may comprise complementarily-formed track-and-bead structures, interdigitating or overlapping channels or flanges, and other arrangements that are known in the prior art.

Panels like that of FIG. 1 can be produced in several ways: 1) the conduits 110, cores 108, and skins 102 and 104 can be cut to size and bonded together in a batch process; and 2) existing panel fabrication machines; which include un-coilers to handle coils of sheet metal, corrugating rolls to form top and bottom skins, and foam injection equipment to extrude foam between the skins, can be modified by the addition of spools which carry rolls of plastic conduit and guides which are controllable for position and tension. In operation, the plastic conduit is fed between the top and bottom skins at the same lineal rate as the corrugating rolls feed the skins and at the same rate that the foam expands and consolidates to form the core. The guides position the plastic conduits to achieve good thermal contact to the designated sheet metal skin.

FIG. 1A shows a perspective view of two panels 100, as shown in FIG. 1, joined together at an angle to form the crest or ridge of a roof. The intersection of the two panels forms a chase or cavity for manifold 112 for conveying fluid. A removable, sheet metal ridge cap 116 covers the upper ends of panels 100 and manifold 112.

FIG. 1B is a section view of the roof panel of FIG. 1A showing ridge cap 116 in place over the ends of two panels 100, manifold 112, one of fluid conduits 110, a photovoltaic solar collector 120, and an electrical junction box 124. An electrical conduit 122 conveys current from solar collector 120 to junction box 124. Photovoltaic solar collectors 120 are bonded to the exterior surface of panel 100 running parallel to the panel edge.

FIG. 1C is a section view of an outer edge of the roof panel. The outer edge of the panel forms an eave or overhang. Skins 102 and 104, insulating core 108, conduit 110, and manifold 112. A removable soffit cap or eave trim 118 covers and protects the lower end of panel 100, conduit 110, and manifold 112.

Figure 1D:
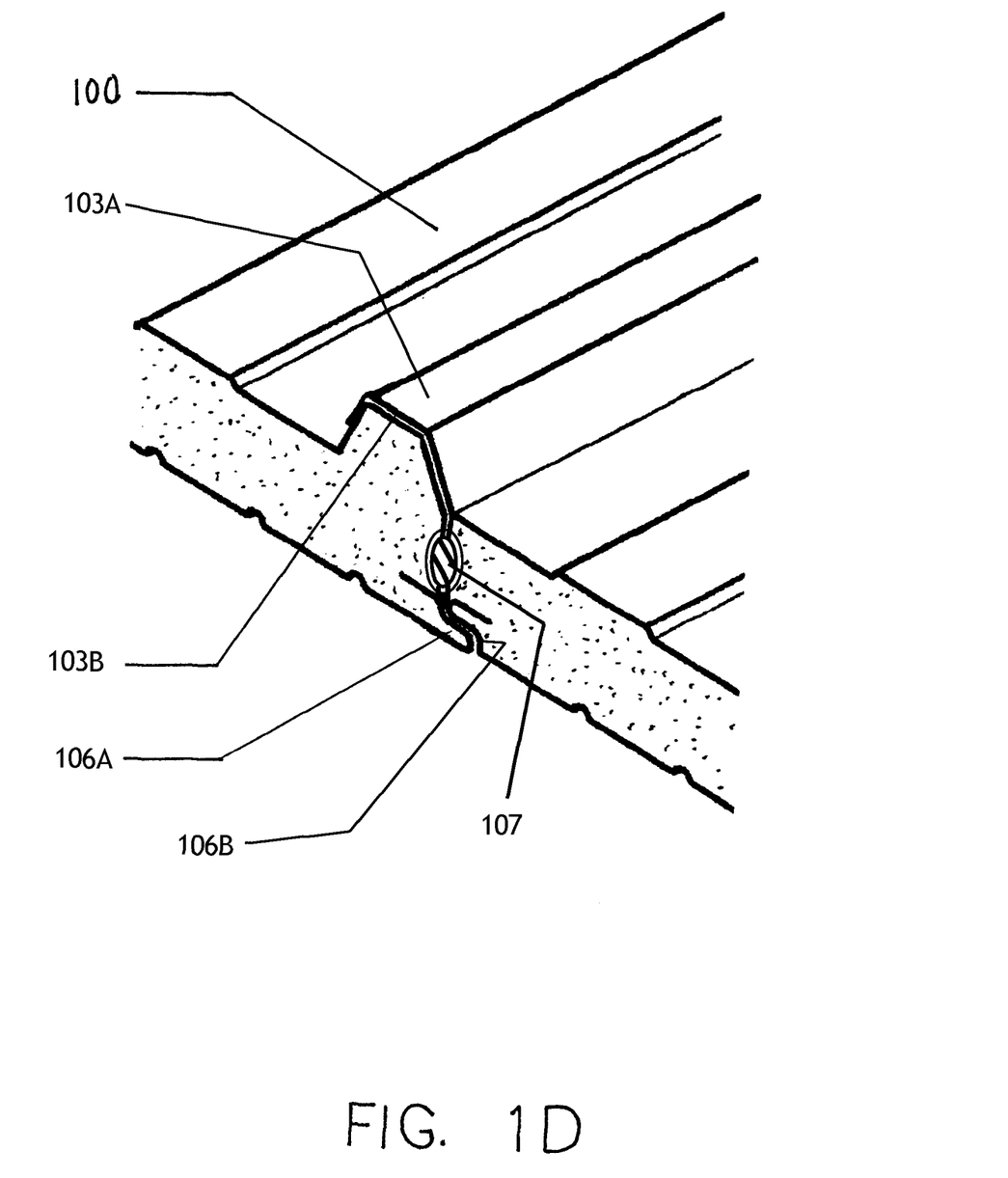
FIG. 1D is a cutaway perspective detail elevation of two panels joined edge-to-edge.

Panels 100 can extend the full length of the roof slope, from eave to ridge, due to their structural strength. The longitudinal edges fit together with interlocking, weather-tight joints 106 (FIG. 1, 1D). Skins 102 and 104 are preferably made of roll-formed, 0.55 to 0.85 mm thick galvanized steel or Galvalume™ (surface-treated aluminum/steel), although other thicknesses, methods of forming, and materials can be used. Recycled materials can be used, if desired. They can be painted or left bare.

Insulating core 108 is preferably made of CFC-free isocyanurate foam having a density of 2.2 to 2.5 pounds per cubic foot (35.2 to 40.0 kg/m$^3$) density, but other materials such a polyurethane, phenolic, expanded polystyrene (EPS), or extruded polystyrene (XPS) can be used for specific applications. The core can also be fabricated from mineral wool in order to achieve fire-resistive panels. In all configurations, core 108 prevents interior skin 104 from coming in contact with exterior skin 102, thereby preventing thermal bridging or heat transfer through framing members typical in conventional construction.

Fluid conduit 110 is made of extrudable plastic, such as polyethylene (PE), cross-linked polyethylene (PEX) or polypropylene (PP), although other materials can be used. Fluid conduit 110 may be coated with an isolating layer or sleeve to prevent chemical interaction between the conduits and the insulating core.

In a roof-collector configuration, conduit 110 is positioned precisely in the panel fabrication process to contact outer skin 102 such that the contact promotes thermal conduction. The foam-in-place core assures that contact is maintained by the rigid core. Where conduit 110 conflicts with a roof pipe penetration or roof duct penetration, the conduit can be isolated, or blanked-off at manifolds 112.

In the present embodiment, fluid conduits 110 connect to manifolds 112 at the roof ridge. The manifolds and connections are covered by removable sheet metal ridge cap 116. As such, the manifolds and connections are completely concealed, but are accessible for future maintenance. The proximity of ridge manifold 112 and removable sheet metal ridge cap 116 makes it convenient to locate automatic air bleeder valves (not shown—used to bleed air from the fluid system) at the high points of the hydronic system at the ridge. At the lower end, fluid conduits 110 connect to manifolds 112 at the eave. The manifolds and connections are covered by removable sheet metal eave trim, such as soffit cap 118.

The panels, conduits, manifolds, and photovoltaic collectors can be incorporated into complete radiant hydronic systems including pumps, valves, heat exchangers, expansion tanks, and monitoring and control equipment by those having ordinary skill in the art. The arrangement of conduits and manifolds shown readily lends itself to configuration as a "drain-back" system. Drain-back systems are used in extremely cold climates to prevent freezing. In a drain-back system, when the circulation pumps cease pumping, the fluid medium within conduits 110 and manifolds 112 drains by gravity out of the collector into a holding tank. The fluid is replaced by air that does not expand and damage the fluid conduits as a freezing fluid would. Potable water can be used as the circulation fluid, if desired.

In non-drain-back systems, the fluid medium stays in the fluid conduits whether or not it is circulating. Non-drain-back systems in cold climates require anti-freezing agents such as ethylene glycol. In non-drain-back systems there is always a risk of cross-contamination from anti-freezing agents to potable water. The panels can be incorporated into complete drain-back systems by those having ordinary skill in the art.

First Embodiment Operation

FIGS. 1-1C

When panels 100 are exposed to incident solar radiation, the radiation warms exterior skin 102. This heat is transferred by conduction from skin 102, through fluid conduits 110, to a fluid (not shown) circulating within conduits 110 and manifolds 112, thereby warming the fluid. The warmed fluid is then moved elsewhere, typically by a pump (not shown) where its heat is extracted.

Panels 100 are low-temperature collectors. There is no glazing or transparent covering, and the panels do not take advantage of the "greenhouse effect" which would prevent heat collected by the conduits from being re-radiated back into the atmosphere. However, the area available for solar thermal collection can be very large—the entire sun-facing surface of the building. This collects many BTUs but in a relatively narrow band of usable heat. This low-temperature heat can be stored, or used directly to heat the conditioned spaces of the building, or used to pre-heat fluid to a conventional hot-water hydronic boiler, or to pre-heat domestic hot water with or without a heat exchanger.

Under conditions of no insulation (no incident solar radiation, i.e., at night) and/or cool outdoor temperatures, roof panels used as exterior building covering are available to act as radiant surfaces to transfer heat from the circulating fluid to the exterior metal skin of the panel, thereby cooling the fluid. This embodiment is midway (conceptually) between solar shading and air conditioning on the gradient of increasing cooling complexity, but it is energy efficient, requiring only fractional horsepower circulation pumps in lieu of fans and compressors.

Under winter conditions, by circulating heated fluid through the conduits, the roof can be used as a radiant surface to melt snow. The photovoltaic solar collectors performance thus can be boosted by melting the snow to expose the photovoltaic surface to sunlight.

First Alternative Embodiment Description

Figure 2:
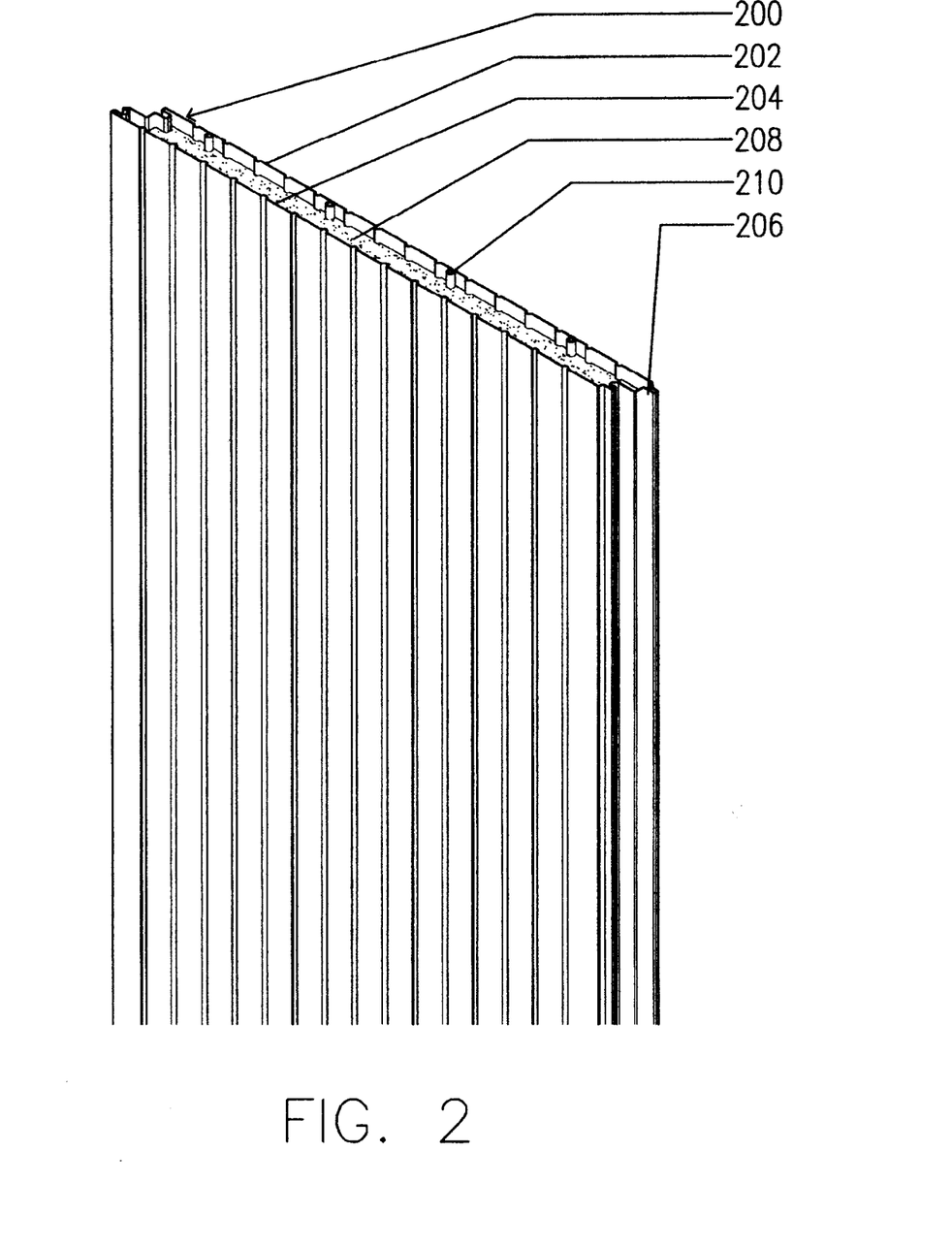
FIG. 2 is a perspective view of a wall panel with fluid conduits adjacent to the interior surface.
Figure 2A:
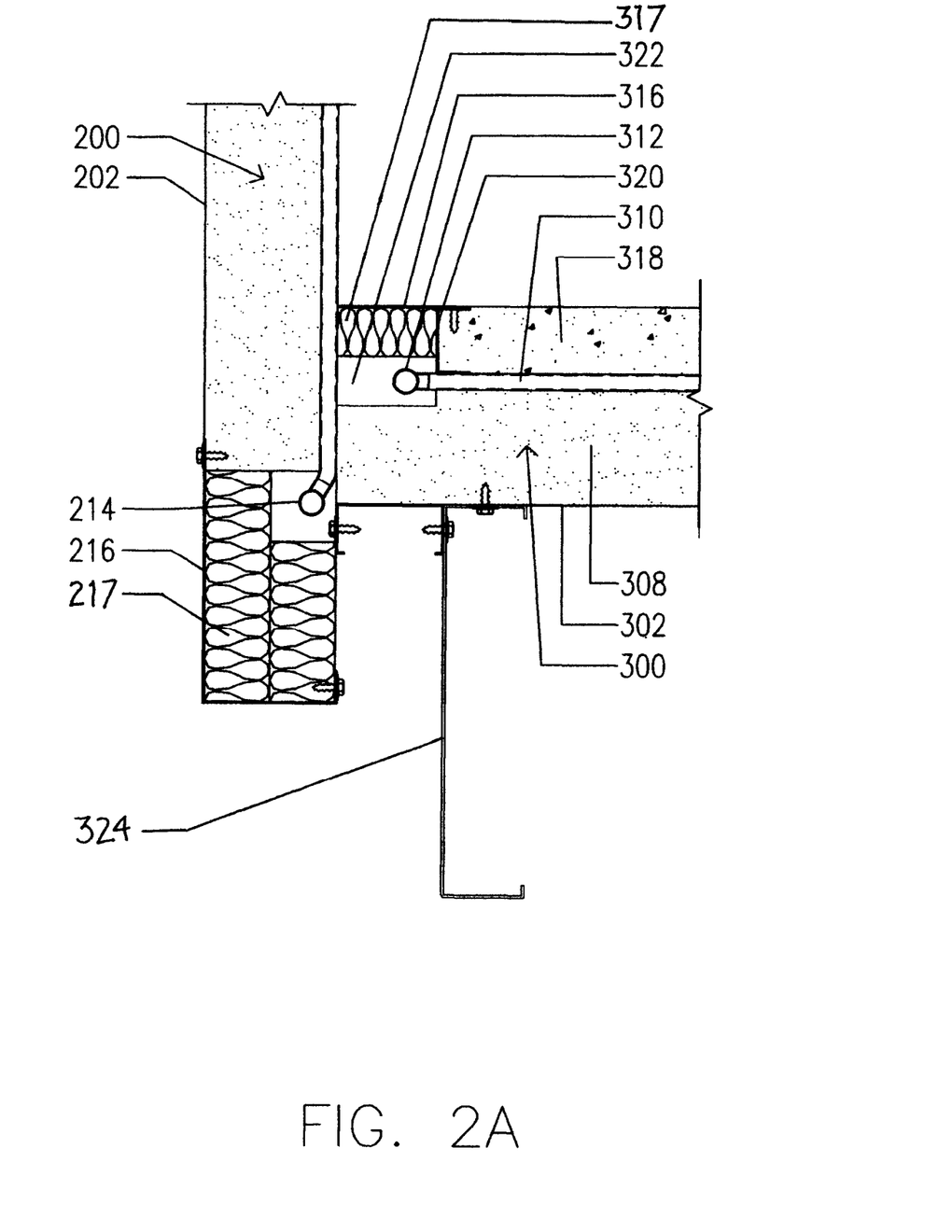
FIG. 2A is a detailed cross-sectional elevation of the wall panel adjacent to a floor panel.

Wall Panel—FIGS. 2 and 2A

FIG. 2 shows a perspective view of an alternative embodiment of an insulated panel 200, similar in construction to the previous embodiment. A wall panel 200 is typically installed vertically, and comprises an exterior skin 202 that functions as the exterior finished surface of a wall. An interior skin 204 functions as the interior finished surface of a wall. Skins 202 and 204 are separated by an insulating core 208. As in the previous embodiment, panels 200 contain fluid-filled conduits 210 that are enclosed in core 208 and held in thermal contact with exterior skin 202.

As shown, the longitudinal edges at the exterior skin of panel 200 are shaped to facilitate joining together with adjacent panels. The exterior skin joints interlock to resist water penetration and air infiltration. Panels joined together provide a weather-resistant exterior wall surface.

The longitudinal edges at the interior skin of panel 200 are shaped to facilitate joining together with adjacent panels (FIG. 2, elements 206) to provide a finished, interior surface. All of the edge joining features shown in FIGS. 1-1D may be incorporated in the embodiment of FIG. 2. The finished surface meets requirements selected from, but not limited to, the following list: appearance, protection, durability, safety, and cleaning. The longitudinal joining features 206 at confronting edges of adjacent panels may comprise complementarily-formed track-and-bead structures, interdigitating or overlapping channels or channels and flanges, and other arrangements that are known in the prior art, to join the exterior surface in a weatherproof manner. Thus the panels may be joined in a side-by-side matrix that is sealed to provide an assembly that has significant structural strength, weathertight construction, and solar thermal energy recover.

FIG. 2A shows a sectional view of a wall panel 200 adjacent to a floor panel 300. In a wall configuration, manifolds and various other plumbing connections (not shown) are provided at the top of the wall, and manifolds 214 are provided at the bottom of the wall in a chase, or passageway, under a removable sheet metal cover 216. Insulation 217 is field-installed after manifold 214 is installed, but prior to the installation of cover 216. As such, the manifolds and connections are completely insulated and concealed, but are accessible for future maintenance. Where conduit 110 conflicts with a door, window, or other wall penetration, the conduit can be isolated, or blanked-off at manifolds 112.

Where wall panel 200 is used in a sun-facing location, photovoltaic solar collectors can be bonded to the exterior surface of the panel. The wiring, conductors, or leads from the photovoltaic collectors are installed in the chase or passageway protected by removable sheet metal cover 216.

First Alternative Embodiment Operation

FIGS. 2 and 2A

When wall panels 200 are exposed to insulation, the panels (exterior metal skin 202) transfer the radiant energy to the fluid conduits 210, and thence to the circulating fluid. Under conditions of no insulation (night) and/or cool (shaded) outdoor temperatures, wall panels used as exterior building covering are available to act as radiant surfaces to transfer heat from the circulating fluid to the exterior metal skin of the panel, thereby cooling the fluid.

Second Alternative Embodiment Description

Figure 3:
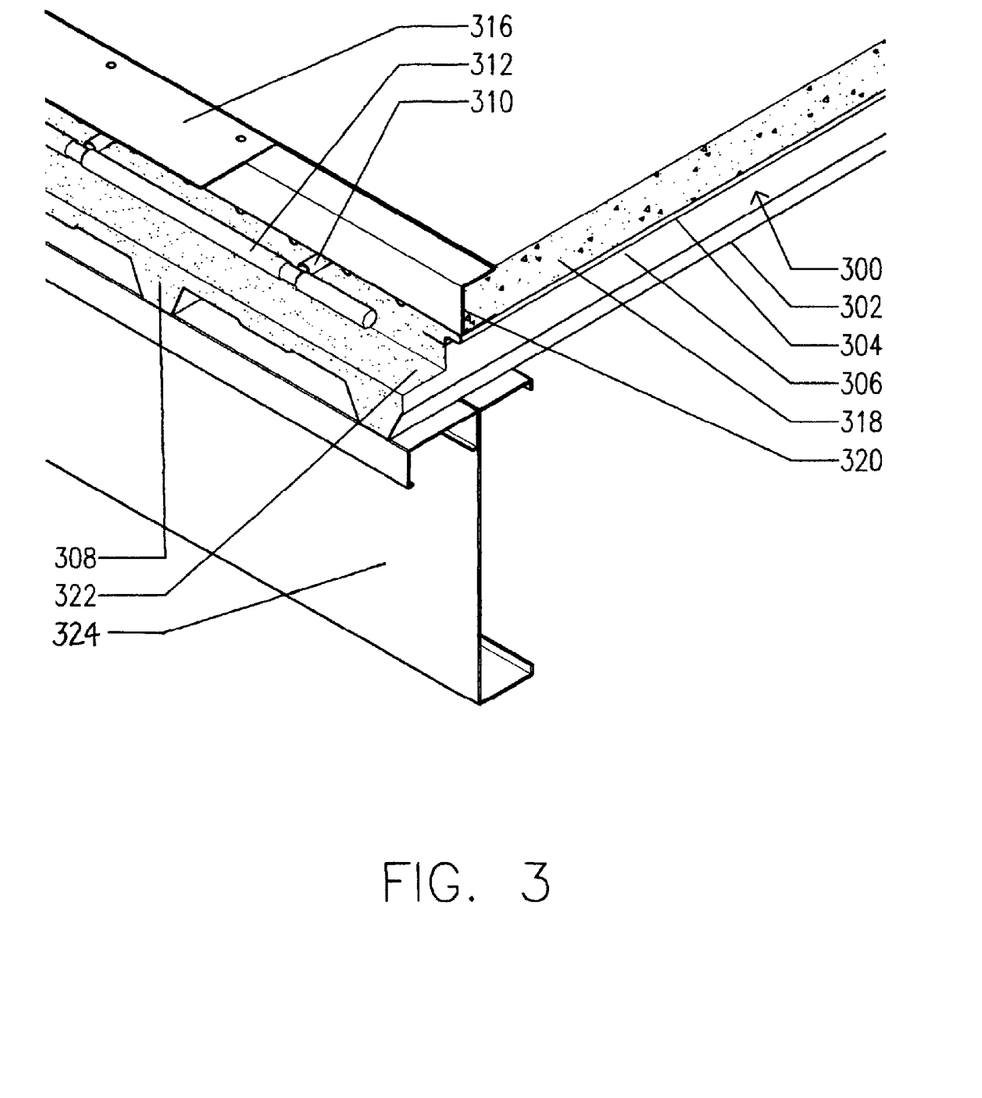
FIG. 3 is a perspective view of a floor panel assembly with fluid conduits adjacent to the interior surface.

Floor Panel—FIG. 3

FIG. 3 shows a perspective, sectional view of an alternative embodiment of an insulated panel 300. A floor panel 300 comprises a downward-facing exterior skin 302 and an upward-facing interior skin 304 that are separated by an insulating core 308. The panel construction is as described in the embodiments above, except that in the present configuration, the fluid conduits are positioned precisely during manufacture to contact interior skin 304 such that the contact promotes thermal conduction. An underlayment 318 is installed over the entire floor area. The underlayment can be cementitious, composite, plywood, or particle board. An underlayment stop 320 is placed 10 cm to 20 cm (4" to 8") from exterior wall 200 (FIG. 2A), and an accessible maintenance chase 322 thus formed has insulation 317 installed, and is then covered with a removable sheet metal floor cover 316. The underlayment can be exposed, stained, painted, or can be covered with any finish flooring material. Fluid conduits 310 are connected to manifolds 312 in the accessible maintenance chase 322. Floor panels 300 are attached to under-floor structure 324, shown in FIGS. 2A and 3 as steel joists. Note that interior skin 304 of the floor panels affords a high degree of protection to the fluid conduits 310 during the course of construction.

Operation of Second Alternative Embodiment

FIG. 3

In this embodiment, circulating fluid transfers heat to fluid conduits 310, which in turn transfer heat to the interior skin 302, which in turn transfers heat to underlayment 318, which becomes a radiant surface to warm the conditioned space.

The technology of radiant hydronic heat is well established in which precise control of the circulating fluid temperature gives precise temperature control of the conditioned space. The large volume of moving air which is typically needed for forced-air furnaces to attain such accurate control is not required. Operationally, fractional-horsepower pumps replace multi-horsepower air handlers. The panels are incorporated into complete radiant hydronic systems including pumps, valves, heat exchangers, expansion tanks, and monitoring and control equipment by those having ordinary skill in the art.

Under conditions of elevated temperatures in the conditioned space, floor panels are available to act as collectors; heat from the underlayment 318 transfers to the interior metal skin 304 of the panel, to the fluid conduits 310, and thence to the circulating fluid. In the floor collector configuration, heat is removed from the floor and transferred to the circulating fluid thereby cooling the floor.

Third Alternative Embodiment Description

Special Skins

In a third embodiment, not shown, the panels are manufactured with stainless steel skins meeting NSF (food handling) standards, or with any metal required for a laboratory service. The skins can be embossed, textured, or coated to meet architectural requirements for color, light reflectance, acoustic absorption, longevity, corrosion resistance, or other architectural application. These floors, walls, ceilings, and roofs are suitable for food service, laboratories, medical facilities, which require high-wear, impervious surfaces and/or frequent cleaning.

Fourth Alternative Embodiment Description

Photovoltaic Panel—FIG. 1B

In a fourth embodiment, a photovoltaic cell 120 is attached to the exterior surface of panels facing towards the sun. Typically, the cells are flexible, thin-film, relatively low watts-per-square-meter, photovoltaic collectors. The spacing and width of the longitudinal corrugations (103 in FIG. 1) or projections on the exterior metal skin of the panels may be adjusted to accommodate photovoltaic cells 120. In addition, the position, placement, and extent of the conduits 110 may be selected to be proximate to a maximum extent of the PV cells 120 that are directly adjacent on the exterior upper surface. Likewise, the corrugations 103 may be shaped laterally to maximize direct contact with the PV cells. These arrangements enable the solar thermal energy buildup that generally occurs in PV cells to be carried away by the fluid circulating in the conduits 110. In addition, the conduits 110 may be employed in winter conditions to heat the panels (when used as a roof) to remove snow and ice and restore PV output that would otherwise be blocked by the snow or ice.

The cells can be factory or field installed directly to the flats or valleys of the panel. The skins can be embossed, textured, or coated to meet architectural or environmental requirements for color, light reflectance, acoustic absorption, longevity, corrosion resistance, or other architectural or environmental applications.

Alternatively, the photovoltaic cells 120 can be printed (see Sager, supra) directly onto the steel coil stock used to form the exterior metal skins of the panels.

The output conductors or wiring 122 for the photovoltaic cells 120 are located at the upper end of the cells and extend to the ridge. Electrical conduits and junction boxes 124 under the removable sheet metal ridge cap 116 are provided to protect a power cable 123 connected to the PV panel wiring 122 as well as personnel. The conduits are then joined to the building electrical system in a concealed, weather-tight manner. The conduit construction enables maintenance personnel and emergency personnel (firefighters, law enforcement) to know the exact placement of the PV conductors and cables so that accidental exposure to high voltage may be avoided.

The cells are incorporated into complete solar photovoltaic systems with conduit, conductors, grid-tied or stand-alone inverters, circuit breakers, and monitoring and control devices, by those having ordinary skill in the art.

The longitudinal corrugations in the exterior skins offer some measure of protection from falling objects impacting the cells, not otherwise available to flat-plate, crystalline, photovoltaic cells. Such flat-plate, crystalline, photovoltaic cells often must be elevated above the roof surface to provide for cooling air currents, making them more prone to damage. In contrast, the PV cells of these embodiments are cooled by the fluid circulating in the conduits, which enable the PV cells to be secured directly to the exterior surface. The panels 100 are joined in a side-by-side matrix that is sealed to provide an assembly that has significant structural strength, weathertight construction, solar thermal energy recover, and photovoltaic energy recover.

Operation of Fourth Alternative Embodiment

FIG. 1B

Under conditions of solar gain, the photovoltaic cells 120 generate electrical current. The electric current generated can be used to charge batteries in an off-grid installation, or to offset purchased electricity in a grid-tied installation. Although the output of thin-film cells is considered low, the area available for the photovoltaic part of this embodiment can be very large, covering the entire sun-facing surface of the building.

Photovoltaic cells generate heat as a by-product of electrical generation. Photovoltaic cell efficiency falls off somewhat as temperatures rise. Placing the solar-thermal fluid conduits appropriately on the inside of the exterior skin may reduce the temperature of the photovoltaic cells placed on the outside of the exterior skin, thereby increasing cell efficiency, and may also increase heat transfer to the circulating fluid in a synergistic manner. Because the panels are un-glazed, before temperatures approach the point of damaging the photovoltaic cells, the excess heat merely re-radiates into the atmosphere rather than being trapped by the "greenhouse effect".

In the event of fire during sunny conditions, firefighters may disconnect a building's main electrical service from the electrical grid. This does not disable the photovoltaic cells, and the substantial risk of shock exists to firefighters working near the cells, particularly cutting holes in the roof for smoke evacuation. This embodiment protects the electrical wiring under removable sheet metal caps and in conduit, and provides additional safety for firefighters by confining the wiring to well-defined chases that are easily identified.

CONCLUSION, RAMIFICATIONS, AND SCOPE

In all configurations, the panels allow rapid erection, provide finished interior wall and ceiling surfaces, and exterior wall and roof surfaces, and are weather tight, with extremely low invested hours per square foot of semi-skilled labor. All fluid conductor connections can be completed after the panels are in place and weather tight. All fluid conductors can be tested and inspected under pressure, and if necessary repaired, prior to the final covers being installed. With the covers installed, all manifolds, supply and return piping, and conduits and conductors are protected and concealed.

In all embodiments, the panels draw from a number of distinct areas of research and commercial effort: insulated structural building panel manufacturing, radiant heating systems, solar thermal collectors, solar photovoltaic collectors, and solar panel mounting systems. These various embodiments adhere to several fundamental tenets: they address the longstanding problems of global warming and carbon emissions, both in terms of low net-embodied-energy in the panels themselves, and in low operating energy over the life of the building in which they are installed; they combine well-understood existing technologies; they are cost-effective; and they are easily and quickly installed without sophisticated expertise or equipment.

While the above descriptions contain many specificities, these should not be construed as limitations on the scope of any embodiment, but as exemplifications of the presently preferred embodiments thereof. Many other ramifications and variations are possible within the teachings of the various embodiments. For example, materials may be substituted, sizes can be changed, shapes can be changed, and work anticipated to occur in a production setting may be better accomplished in the field, and vice versa. Thus the scope should be determined by the appended claims and their legal equivalents, and not by the examples given.

The invention claimed is:

1. A structural panel with integrated energy collection for use in building construction, comprising:
   a fabricated exterior metal skin, said exterior metal skin including a weather-resistant exterior surface;
   said exterior metal skin having at least one pair of opposed exterior edges, said pair of opposed exterior edges having complementary exterior edge joining components arranged to mutually engage and resist water penetration and air infiltration when joined with a corresponding opposed exterior edge of an adjacent, like-formed structural panel;
   a fabricated interior metal skin, said interior metal skin having a finished interior surface;
   a core layer disposed between said exterior metal skin and said interior metal skin so that said exterior metal skin and said interior metal skin sandwich said core layer, said core layer comprising a stiff, thermally insulating material;
   a plurality of extruded conduits which can circulate fluid capable of heat transfer, said plurality of extruded conduits being located between said exterior metal skin and said interior metal skin and embedded within said core layer, said extruded conduits being in direct contact with said exterior metal skin to enhance thermal conduction therewith;
   further including at least one photovoltaic cell secured to said exterior metal skin;
   said panel including an upper lateral edge extending between said pair of opposed exterior edges, and further including at least one electrical conductor extending from said at least one photovoltaic cell to said upper lateral edge,
   a power cable extending along said upper lateral edge to connect to said at least one electrical conductor, and a ridge cap secured above said upper lateral edge to protect said power cable and connections to said electrical conductors;
   a plurality of said like-formed panels arranged with their respective upper lateral edges in alignment, said power cable spanning said upper lateral edges and connected to all of said electrical conductors of said photovoltaic cells;
   said ridge cap spanning said upper lateral edges and protecting substantially the entire extent of said power cable; and,
   at least one upper manifold extending along said upper lateral edges of said panels and connected to like upper ends of said conduits in fluid circulating fashion.

2. The structural panel with integrated energy collection of claim 1, wherein said interior metal skin includes at least one pair of opposed interior edges, said pair of opposed interior edges having complementary interior edge joining components arranged to mutually engage and seal when joined with a similar opposed interior edge of an adjacent, like-formed panel.

3. The structural panel with integrated energy collection of claim 2, wherein said conduits extend generally parallel to said pair of opposed exterior edges.

4. The structural panel with integrated energy collection of claim 1, wherein said core layer comprises a foam-in-place expanded polymer material.

5. The structural panel with integrated energy collection of claim 1, wherein said at least one photovoltaic cell is positioned proximate to at least one of said conduits for optimum heat transfer between said photovoltaic cell and the circulating fluid in said conduit.

6. The structural panel with integrated energy collection of claim 1, wherein said at least one upper manifold extends within said ridge cap and is protected thereby.

7. The structural panel with integrated energy collection of claim 1, further including at least one lower manifold extending along like lower lateral edges of said panels and connected to like lower ends of said conduits in fluid circulating fashion.

8. The structural panel with integrated energy collection of claim 1, wherein at least one of said interior and exterior metal skins is fabricated of metals suitable for food or laboratory service.

9. The structural panel with integrated energy collection of claim 1, further including a plurality of panels that are attached together by fasteners extending through at least one of said fabricated exterior metal skin or said fabricated interior metal skin to a building structural component to form self-supporting building floors, building walls, or building roofs, said panels containing cavities, chases, and accessible covers for the connection and maintenance of said fluid conduits.

10. The structural panel with integrated energy collection of claim 1, wherein said metal skins are fabricated of metals or materials suitable to meet at least one architectural requirement selected from the group consisting of color, light reflectance, acoustic absorption, longevity, corrosion resistance, and wear resistance.

11. The structural panel with integrated energy collection of claim 1, wherein said core is arranged to meet at least one environmental requirement selected from the group consisting of dampness, high temperature, low temperature, and fire resistance.

12. The structural panel with integrated energy collection of claim 1, further including an isolating layer or sleeve positioned between said conduits and said insulating core to prevent chemical interaction therebetween.

* * * * *